(12) United States Patent
Gao et al.

(10) Patent No.: US 11,187,808 B2
(45) Date of Patent: Nov. 30, 2021

(54) METHODS AND SYSTEMS FOR PERFORMING GLOBAL NAVIGATION SATELLITE SYSTEM (GNSS) ORBIT AND CLOCK AUGMENTATION AND POSITION DETERMINATION

(71) Applicant: Profound Positioning Inc., Calgary (CA)

(72) Inventors: Yang Gao, Calgary (CA); Wentao Zhang, Cupertino, CA (US); Yihe Li, Dalian (CN)

(73) Assignee: Profound Positioning Inc., Calgary (CA)

( * ) Notice: Subject to any disclaimer, the term of this patent is extended or adjusted under 35 U.S.C. 154(b) by 711 days.

(21) Appl. No.: 15/186,178

(22) Filed: Jun. 17, 2016

(65) Prior Publication Data

US 2016/0370467 A1 Dec. 22, 2016

Related U.S. Application Data

(60) Provisional application No. 62/182,358, filed on Jun. 19, 2015.

(51) Int. Cl.
*G01S 19/07* (2010.01)

(52) U.S. Cl.
CPC .................................. *G01S 19/07* (2013.01)

(58) Field of Classification Search
None
See application file for complete search history.

(56) References Cited

U.S. PATENT DOCUMENTS

| 8,120,529 B2 * | 2/2012 | Bar-Sever | G01S 19/27 342/357.66 |
| 2012/0062416 A1 * | 3/2012 | Syrjarinne | G01S 19/06 342/357.43 |
| 2016/0131764 A1 * | 5/2016 | Chan | G01S 19/05 342/357.42 |

* cited by examiner

*Primary Examiner* — Whitney Moore
(74) *Attorney, Agent, or Firm* — Louis B. Allard; Borden Ladner Gervais LLP (57) ABSTRACT

Methods and systems for methods and systems for performing GNSS orbit and clock augmentation and position determination are disclosed. In an embodiment, a method for performing GNSS augmentation and position determination includes obtaining orbit/clock initial parameters with a receiver device, generating a numerically-integrated orbit and extrapolated clock in response to the orbit/clock initial parameters with a processing device, and processing the observations of a GNSS receiver and the numerically-integrated orbit and extrapolated clock to derive an improved positioning solution with a processing device.

20 Claims, 7 Drawing Sheets

METHODS AND SYSTEMS FOR PERFORMING GLOBAL NAVIGATION SATELLITE SYSTEM (GNSS) ORBIT AND CLOCK AUGMENTATION AND POSITION DETERMINATION

CROSS-REFERENCE TO RELATED APPLICATIONS

This application claims priority to U.S. Provisional Pat. App. No. 62/182,358 filed on Jun. 19, 2015, entitled "METHODS AND SYSTEMS FOR PERFORMING GLOBAL NAVIGATION SATELLITE SYSTEM (GNSS) ORBIT AND CLOCK AUGMENTATION AND POSITION DETERMINATION," the entire contents of which are incorporated herein by reference.

FIELD

This disclosure relates generally to Global Navigation Satellite Systems (GNSS), and more specifically, to methods and systems for performing GNSS orbit and clock augmentation and position determination.

BACKGROUND

GNSS signals being transmitted between satellites and a receiver are subjected to numerous errors, such as satellite orbit and clock errors, atmospheric delay, environmental effects etc. The positioning accuracy with GNSS will be degraded by those errors. GNSS augmentation systems have been developed to determine those errors and provide augmentation data or corrections to mitigate these errors. GNSS augmentation data includes augmented orbit/clock (more precise than the broadcast orbit/clock) or their corrections with respect to the broadcast orbit/clock or other predefined reference orbit/clock, which are usually generated by GNSS reference networks and must be provided to user equipment (UE) in a timely manner. Augmentation data for orbit/clock sent to UEs are typically in the form of orbit/clock corrections with respect to the broadcast orbit/clock or other predefined reference orbit/clock, instead of the augmented orbit/clock itself. The orbit/clock corrections typically include corrections at a reference time and correction rate. But augmented orbit/clock and their corrections may be used equivalently in some systems.

Figure 2:
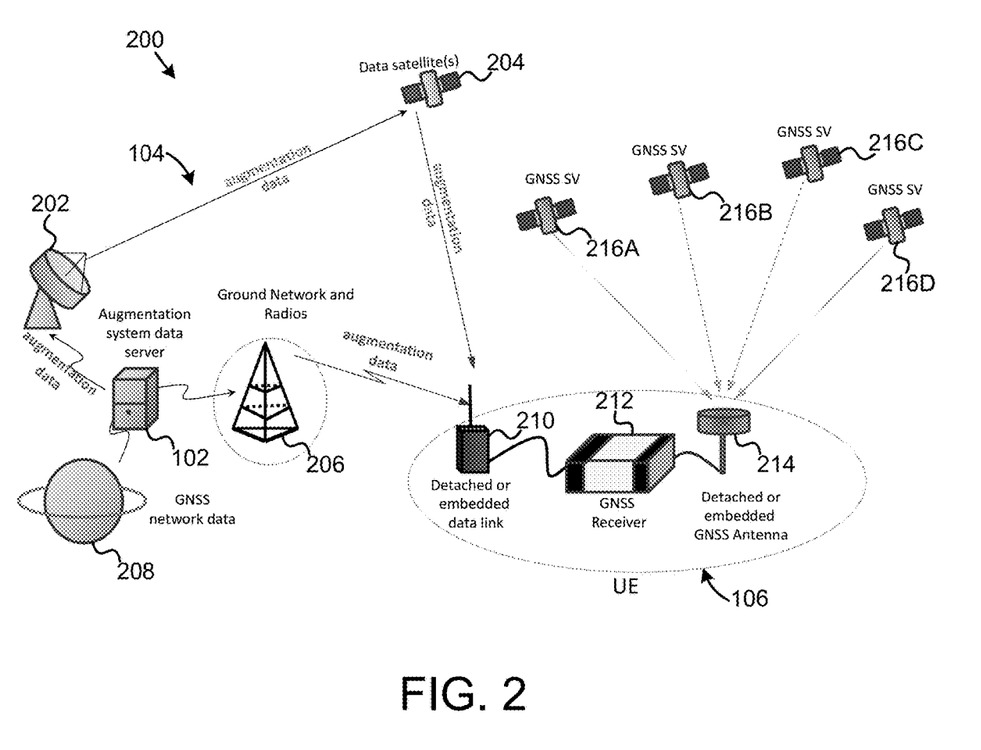
FIG. 2 is a schematic diagram illustrating an embodiment of a GNSS augmentation system.

FIG. 2 illustrates an embodiment of a GNSS system. GNSS augmentation systems can be ground-based or satellite-based, and include code pseudorange-based augmentation systems, such as the Wide Area Augmentation System (WAAS) and local Differential Global Positioning Systems (DGPS) to provide code pseudorange corrections, and carrier phase based systems, such as Continuously Operating Reference Station (CORS) systems to provide carrier phase measurement corrections. For carrier phase-based systems, such as precise point positioning (PPP) and real-time kinematic (RTK), additional augmentation data or corrections may be required in order to facilitate integer ambiguity resolution.

Figure 5:
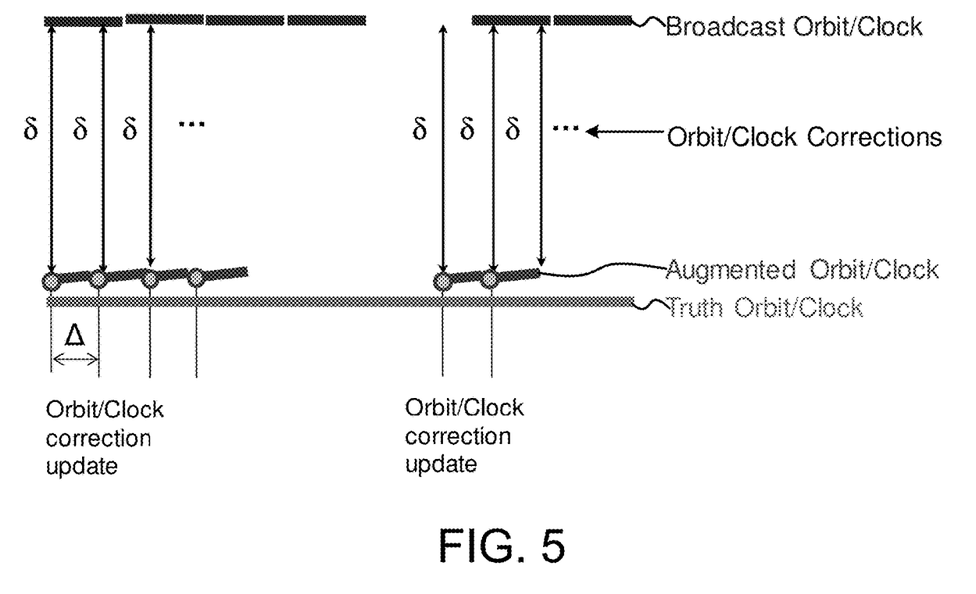
FIG. 5 is a diagram illustrating current GNSS augmentation methods.

FIG. 5 illustrates an example of a method for augmentation, where the augmentation data is provided by the augmentation system data server. The augmentation data provided to UEs from the augmentation system data server are comprised of augmented orbit/clock or their corrections δ with respect to the broadcast orbit/clock. Orbit/clock corrections are sent to UEs via relay infrastructure(s) such as geostationary satellites, the Internet or ground-based radios. Orbit/clock corrections are provided to UEs at a frequency Δ, typically every 1-2 minutes for orbit and every 1-2 seconds for clock.

Upon receiving the orbit/clock corrections δ, UEs apply them to the locally downloaded broadcast orbit/clock to obtain the augmented orbit/clock. UEs use the augmented orbit/clock as the precise orbit/clock to mitigate orbit and clock errors in GNSS observations to derive improved positioning solutions using techniques such as PPP and RTK, among others.

There are a number of problems inherent to GNSS augmentation systems as described above. The system performance is sensitive to the latency of the GNSS satellite orbit and clock corrections, and the delivery latency must be compensated to ensure accuracy. These orbit/clock corrections are needed to provide to UEs at a frequent update rate typically every 1-2 minutes for orbit and 1-2 seconds for clock.

Current augmentation systems are also susceptible to ground network connectivity or line of sight restrictions for reception of augmentation data from data relay satellites. These systems also see performance degradations in cases of delayed/missing augmentation data, which result in longer calculation times for position convergence and ambiguity resolution, worse positioning accuracy, and the need to perform position re-convergence and ambiguity re-initialization.

SUMMARY

Methods and systems for methods and systems for performing GNSS orbit and clock augmentation and position determination are disclosed. In an embodiment, a method for performing GNSS augmentation and position determination includes obtaining orbit/clock initial parameters with a receiver device, generating a numerically-integrated orbit and extrapolated clock in response to the orbit/clock initial parameters with a processing device, and processing the observations of a GNSS receiver and the numerically-integrated orbit and extrapolated clock to derive an improved positioning solution with a processing device.

In an embodiment, an apparatus, such as a GNSS receiver, may include a receiver configured to obtain orbit/clock initial parameters with a receiver device, and a processing device coupled to the receiver, the processing device configured to generate a numerically-integrated orbit and extrapolated clock in response to the orbit/clock initial parameters, and process the GNSS observations and the numerically-integrated orbit and extrapolated clock to derive an improved positioning solution.

In an embodiment, a system may include a GNSS augmentation system data server configured to provide orbit/clock initial parameters. The system may also include a relay system coupled to the GNSS augmentation system, the relay system configured to communicate the orbit/clock initial parameters. Additionally, the system may include a GNSS receiver coupled to the relay system, the GNSS receiver configured to receive the orbit/clock initial parameters, generate a numerically-integrated orbit and extrapolated clock in response to the orbit/clock initial parameters, and process the GNSS observations and the numerically-integrated orbit and extrapolated clock to derive an improved positioning solution.

BRIEF DESCRIPTION OF THE DRAWINGS

The present invention(s) is/are illustrated by way of example and is/are not limited by the accompanying figures.

DETAILED DESCRIPTION

Figure 1:
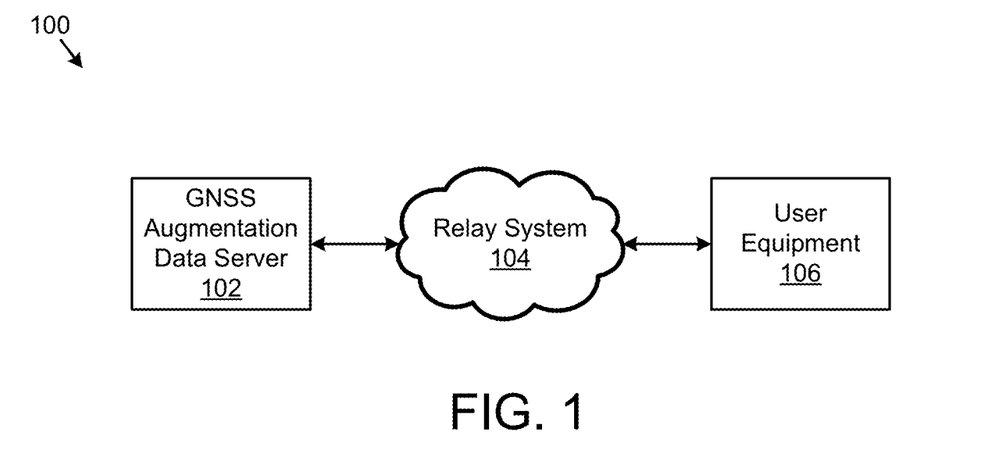
FIG. 1 is a schematic block diagram illustrating an embodiment of a GNSS augmentation system.

FIG. 1 illustrates an embodiment of a system 100 for GNSS orbit and clock augmentation and position determination. In an embodiment, the system 100 includes a GNSS augmentation data server 102, a relay system 104, and UE 106. The GNSS augmentation system data server 102 may provide orbit/clock initial parameters. In an embodiment, the a relay system 104 may be coupled to the GNSS augmentation data server 102 and configured to communicate the orbit/clock initial parameters to the UE 106. In an embodiment, the UE 106 may include a GNSS receiver coupled to the relay system 104, and configured to receive the orbit/clock initial parameters, generate a numerically-integrated orbit and extrapolated clock in response to the orbit/clock initial parameters, and process the GNSS observations and the numerically-integrated orbit and extrapolated clock to derive an improved positioning solution. Accordingly, the present embodiments may provide improved GNSS satellite lock times and accuracy.

Figure 6:
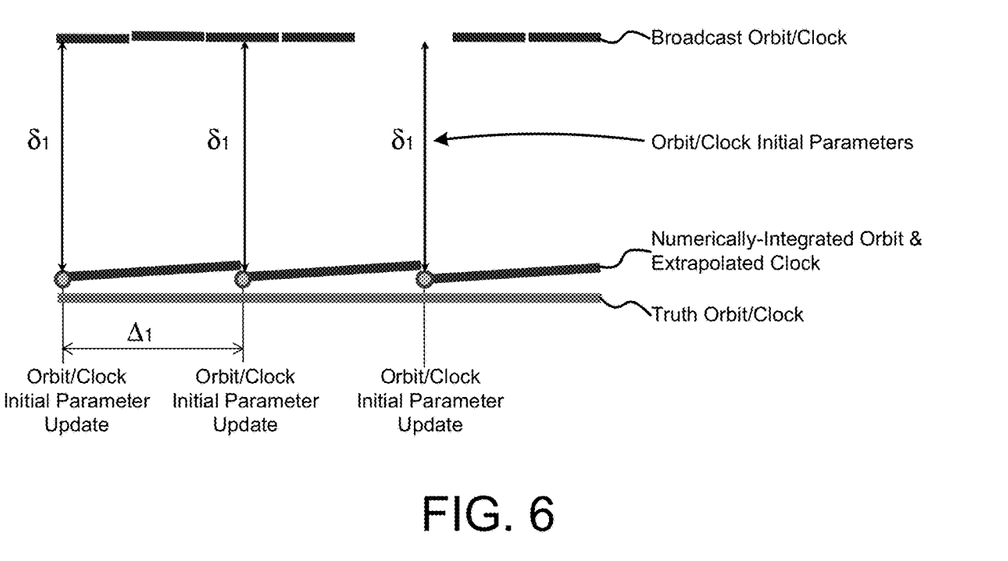
FIG. 6 is a diagram illustrating an embodiment of a method for performing GNSS orbit and clock augmentation and position determination.
Figure 7:
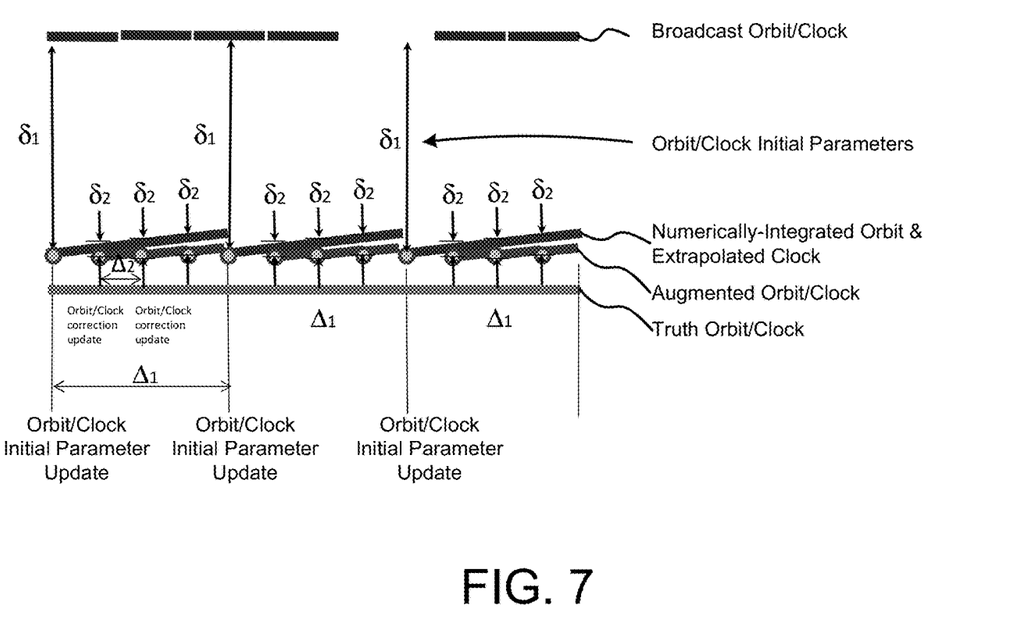
FIG. 7 illustrates another embodiment of a method performing GNSS orbit and clock augmentation and position determination.

In an embodiment, the present methods and systems allow the UEs 106 to handle calculation of numerical integrals for generating models of orbit and clock values based on initial condition data provided periodically over a relay system 104. In an embodiment, the relay system 104 may be a geostationary satellite system 204, as shown in FIG. 2. In another embodiment, the relay system 104 may be a ground-based radio or data system 206. In various embodiments, the UE 106 may apply the extrapolated orbit and clock values to location determination algorithms, without requiring the updates of augmentation data 6 from the GNSS augmentation data server 102. In some embodiments, all that is needed is the initial condition broadcasts 61 as described in FIG. 6. In a further embodiment, as described in FIG. 7, the orbit/clock initial parameters broadcasts M may be received by the UE 106 and the orbit and clock models may be generated as shown in FIG. 6, but augmentation updates 62 may also be received from the GNSS augmentation data server 106, as shown in FIG. 7. In such embodiments, the augmentation updates 62 may be used to tune or updated the extrapolation models of the orbit and clock values. In an embodiment, the augmentation updates 62 of FIG. 7 may be received at a much lower frequency than the augmentation updates 6 through prior methods, such as those described in FIG. 5.

In the embodiment of FIG. 2, the UE 106 may include a detached or embedded data link 210 capable of communicating with the data satellites 204. Alternatively, the data link 210 may communicate with the ground based radios 206, or both. Additionally, the UE 106 may include a GNSS receiver 212, which may include a processing device suitably configured to perform the calculations and operations described herein. Additionally, the UE 106 may include a detached or embedded GNSS antenna 214 configured to make observations of the GNSS satellites 216*a*-*d* in response to the positioning and clock data calculated by the GNSS receiver based on the augmentation data provided by the augmentation data server 102 over the relay system 104.

Figure 3:
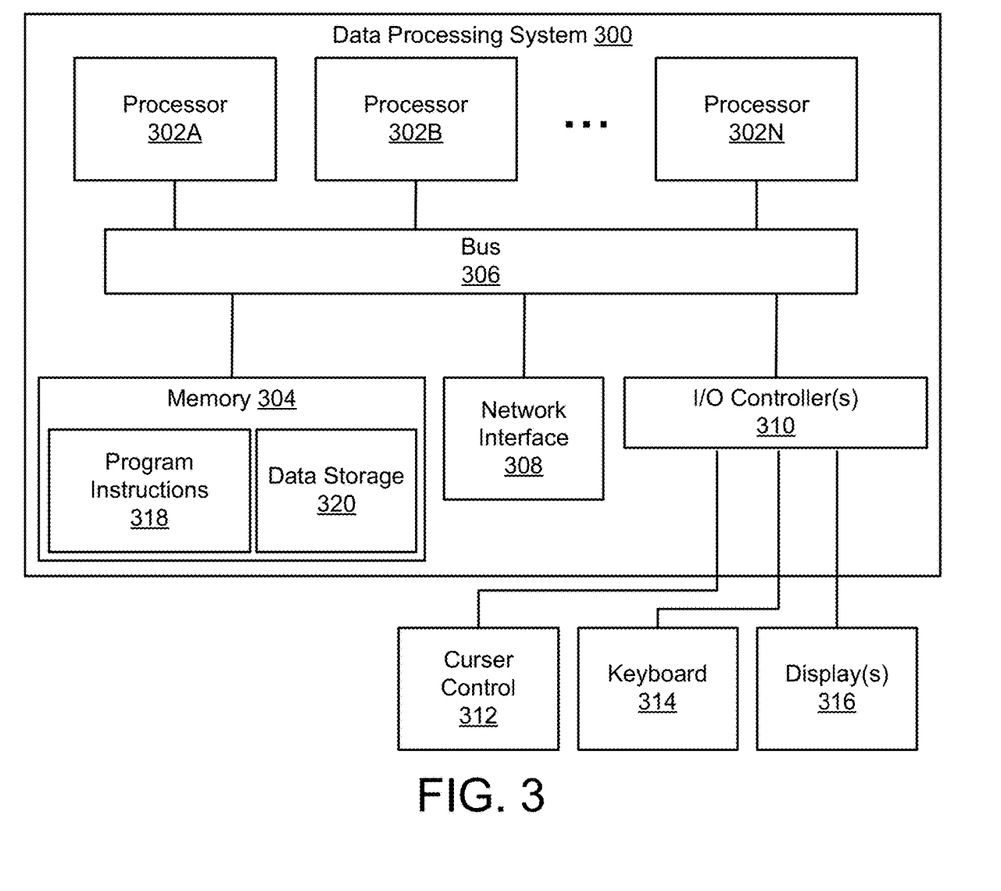
FIG. 3 is a schematic block diagram illustrating an embodiment of a processing device specially configured for use in a GNSS augmentation system.

FIG. 3 is a schematic block diagram illustrating one embodiment of a data processing system 300 configurable for performing GNSS orbit and clock augmentation and position determination. In one embodiment, augmentation data server 102 may be implemented on a data processing system similar to the data processing system 300 described in FIG. 3. Similarly, the UE 106 may be implemented on a system similar to the data processing system 300 described in FIG. 3. In various embodiments, data processing system 300 may be a server, a mainframe data processing system, a workstation, a network computer, a desktop computer, a laptop, or the like. Alternatively, the data processing system 300 may be a GNSS enabled smartphone, or handheld device, an automotive GNSS system, a ship-board GNSS system, an aviation navigation system, or the like.

As illustrated, data processing system 300 includes one or more processors 302A-N coupled to a system memory 304 via bus 306. Data processing system 300 further includes network interface 308 coupled to bus 306, and input/output (I/O) controller(s) 310, coupled to devices such as cursor control device 312, keyboard 314, and display(s) 316. In some embodiments, a given entity (e.g., UE 106) may be implemented using a single instance of data processing system 300, while in other embodiments multiple such systems, or multiple nodes making up data processing system 300, may be configured to host different portions or instances of embodiments (e.g., augmentation data server 102).

In various embodiments, data processing system 300 may be a single-processor system including one processor 302A, or a multi-processor system including two or more processors 302A-N (e.g., two, four, eight, or another suitable number). Processor(s) 302A-N may be any processor capable of executing program instructions. For example, in various embodiments, processor(s) 302A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 302A-N may commonly, but not necessarily, implement the same ISA. Also, in some embodiments, at least one processor(s) 302A-N may be a graphics processing unit (GPU) or other dedicated graphics-rendering device.

System memory 304 may be configured to store program instructions and/or data accessible by processor(s) 302A-N. For example, memory 304 may be used to store software program and/or database shown in FIGS. 4-7. In various embodiments, system memory 304 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 304 as program instructions 318 and data storage 320, respectively. In other embodiments, program instructions and/or data may be received, sent or stored upon different types of computer-accessible media or on similar media separate from system memory 304 or data processing system 300. Generally speaking, a computer-accessible medium may include any tangible, non-transitory storage media or memory media such as electronic, magnetic, or optical media-e.g., disk or CD/DVD-ROM coupled to data processing system 300 via bus 306, or non-volatile memory storage (e.g., "flash" memory)

In an embodiment, bus 306 may be configured to coordinate I/O traffic between processor 302, system memory 304, and any peripheral devices including network interface 308 or other peripheral interfaces, connected via I/O controller(s) 310. In some embodiments, bus 306 may perform any necessary protocol, timing or other data transformations to convert data signals from one component (e.g., system memory 304) into a format suitable for use by another component (e.g., processor(s) 302A-N). In some embodiments, bus 306 may include support for devices attached through various types of peripheral buses, such as a variant of the Peripheral Component Interconnect (PCI) bus standard or the Universal Serial Bus (USB) standard, for example. In some embodiments, the operations of bus 306 may be split into two or more separate components, such as a north bridge and a south bridge, for example. In addition, in some embodiments some or all of the operations of bus 306, such as an interface to system memory 304, may be incorporated directly into processor(s) 302A-N.

Network interface 308 may be configured to allow data to be exchanged between data processing system 300 and other devices, such as other data processing systems attached to GNSS receiver 212, for example. In various embodiments, network interface 308 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 310 may, in some embodiments, enable connection to one or more display terminals, keyboards, keypads, touch screens, scanning devices, voice or optical recognition devices, or any other devices suitable for entering or retrieving data by one or more data processing system 200. Multiple input/output devices may be present in data processing system 300 or may be distributed on various nodes of data processing system 300. In some embodiments, similar I/O devices may be separate from data processing system 300 and may interact with data processing system 300 through a wired or wireless connection, such as over network interface 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

As shown in FIG. 3, memory 304 may include program instructions 318, configured to implement certain embodiments described herein, and data storage 320, comprising various data accessible by program instructions 318. In an embodiment, program instructions 318 may include software elements of embodiments illustrated in FIGS. 4-7. For example, program instructions 318 may be implemented in various embodiments using any desired programming language, scripting language, or combination of programming languages and/or scripting languages. Data storage 320 may include data that may be used in these embodiments such as, for example, augmentation data server 102. In other embodiments, other or different software elements and data may be included.

A person of ordinary skill in the art will appreciate that data processing system 300 is merely illustrative and is not intended to limit the scope of the disclosure described herein. In particular, the data processing system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other data processing system configurations.

Figure 4:
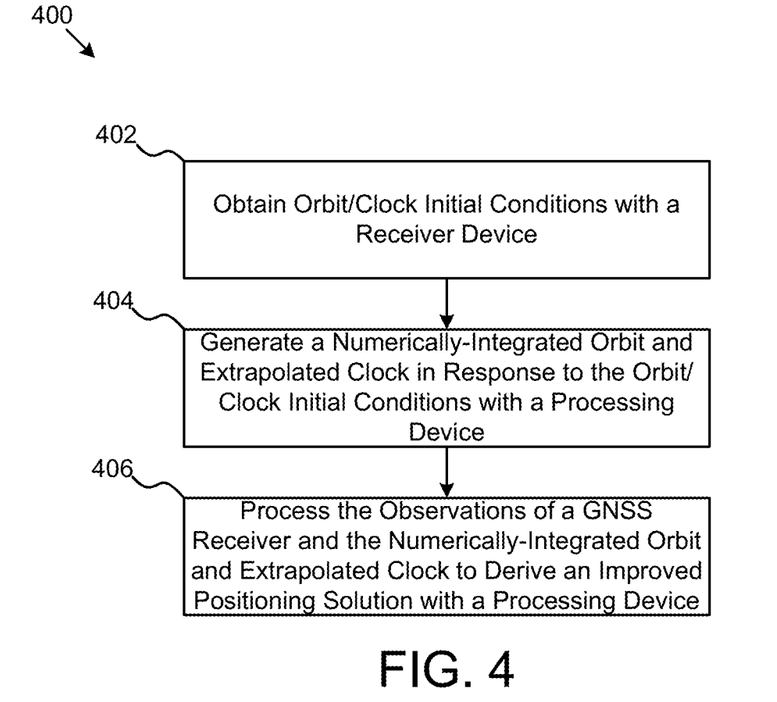
FIG. 4 is a flowchart diagram illustrating an embodiment of a method for GNSS orbit and clock augmentation and position determination.

FIG. 4 illustrates an embodiment of a method 400 for performing GNSS orbit and clock augmentation and position determination. In an embodiment the method includes obtaining orbit/clock initial parameters with a receiver device, as shown at block 402. The method 400 may also include generating a numerically-integrated orbit and extrapolated clock in response to the orbit/clock initial parameters with a processing device, as shown at block 404. Additionally, the method 400 may include processing the observations of a GNSS receiver and the numerically-integrated orbit and extrapolated clock to derive an improved positioning solution with a processing device, as shown at block 406. Further embodiments of such a method are described below with reference to FIGS. 5-7.

In the present embodiments, augmentation data provided to UEs 106 from the augmentation system data server 102 may include the conventional orbit initial conditions or their corrections $\delta_1$ with respect to the broadcast orbit/clock, other orbit related parameters such as solar radiation pressure (SRP) and earth orientation parameters (EOP) for orbit numerical integration, and polynomial and harmonics coefficients for clock modeling. The conventional orbit initial conditions include only the satellite initial position and velocity. In the sequel, the conventional orbit initial conditions and other orbit related parameters such as SRP and EOP for orbit numerical integration, and polynomial and harmonics coefficients for clock modeling are referred as orbit/clock initial parameters as augmentation data. Corrections to the orbit/clock initial parameters with respect to the broadcast orbit/clock or other predefined reference orbit/clock are also referred as orbit/clock initial parameters in the sequel.

The orbit/clock initial parameters or their corrections $\delta_1$ may be sent to UEs 106 via relay systems 104, such as geostationary satellites 204 via ground links 202, the Internet or ground-based radios 206. They are provided at an update frequency $\Delta_1$ which are significantly lower than $\Delta$.

Upon receiving the orbit/clock initial parameters or their corrections at a UE 106, the UE 106 will apply the orbit/clock initial parameters and/or the corrections to generate a numerically-integrated orbit and extrapolated clock. The UE 106 may use the numerically-integrated orbit and extrapolated clock as the precise orbit/clock to mitigate orbit and clock errors in GNSS observations to derive improved positioning solutions using techniques such as PPP and RTK, among others.

In an alternate embodiment, the augmentation data provided to UEs 106 from the augmentation system data server 102 includes: orbit/clock initial parameters or their corrections $\delta_1$ with respect to the broadcast orbit/clock; and augmented orbit/clock or their corrections $\delta_2$ with respect to the broadcast orbit/clock, similar to the methods described in FIG. 5.

Orbit/clock initial parameters and augmentation data $\delta_1$ and $\delta_2$ are sent to UEs 106 via relay system 106 such as geostationary satellites 204, the Internet or ground-based radios 206. The orbit/clock initial parameters or their corrections 61 are provided at an update frequency $\Delta_1$ which is significantly lower than $\Delta$. The augmented orbit/clock corrections or their corrections $\delta_2$ are provided at an update frequency $\Delta_2$ similar to the $\Delta$ of the current augmentation methods.

Upon receiving orbit/clock initial parameters or their corrections $\delta_1$, UEs 106 apply them to generate numerically-integrated orbit and extrapolated clock data. Upon receiving augmented orbit/clock or their corrections $\delta_2$, UEs 106 apply them to generate augmented orbit/clock. UEs 106 use the numerically-integrated orbit and extrapolated clock and/or augmented orbit/clock as the precise orbit/clock to mitigate orbit and clock errors in GNSS observations, where the GNSS observations are of GNSS satellites 216a-d, to derive improved positioning solutions using techniques such as PPP and RTK, among others.

The following general mathematical equation is applied by a UE 106 when calculating the numerically-integrated orbit based on the orbit initial parameters, which include the conventional orbit initial conditions and other orbit related parameters such as SRP and EOP for orbit numerical integration, provided by the augmentation system data server 102.

$$\ddot{r} = -GM \frac{r}{|r|^3} + a(t, r, \dot{r}, SRP, \ldots) \qquad (1)$$

$$r = r(t_0) + \int_{t_0}^{t} \left[ \dot{r}(t_0) + \int_{t_0}^{t} \ddot{r}(t) dt \right] dt \qquad (2)$$

where:
r(t) satellite position at time t
$\dot{r}(t)$ satellite velocity at time t
$\ddot{r}(t)$ satellite accelerations at time t
$t_0$ reference time
t arbitrary time
a perturbation terms
GM Earth gravitational constant In equation 1, the first term is the two-body term, and the second term is the perturbation term. In an embodiment, given the conventional orbit initial conditions at $t_0$ and other orbit related parameters such as SRP and EOP for orbit numerical integration, the whole orbit from $t_0$ to t can be derived through numerical integration.

To calculate the extrapolated clock based on clock initial parameters, which include polynomial and harmonics coefficients for clock modeling, provided by the augmentation system data server, a UE 106 will apply the following general mathematical equation.

$$c = c(p(t_0), dt) + c(h(t_0), dt) + \qquad (3)$$

where:
p(t) polynomial coefficients at time t
h(t) harmonics coefficients at time t
$t_0$ reference time
t arbitrary time In equation 3, the first term is non-periodic and the second term is periodic.

The described embodiments of the GNSS augmentation methods will significantly reduce the effect on UE 106 performance of latency in the delivery of augmentation data from the augmentation system data server 102 to a UE 106. Augmentation data can be sent from the augmentation system data server 102 to a UE 106, at a significantly lower update frequency when compared to current methods, making the system significantly less susceptible to network connectivity and line-of-site restriction between UEs 106 and geostationary satellites 204. The amount of augmentation data sent to UEs 106, comparing to current method and system, is significantly reduced, as is a UE's dependence on the augmentation system data server 102. The augmentation system is more robust due to the reduced amount of data, reduced dependency on the augmentation data and link availability, and reductions to the power consumption of UEs 106.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for performing GNSS augmentation and position determination using a precise orbit/clock reference that is represented by orbit/clock initial parameters, comprising:
   obtaining, at a user device, GNSS augmentation data based on an augmented orbit/clock, the GNSS augmentation data comprising orbit/clock initial parameters;
   generating, at the user device, a reference orbit/clock based on numerically-integrating and extrapolating the orbit/clock initial parameters, the reference orbit/clock having a validity period longer than a broadcast orbit/clock;
   generating, at the user device, the augmented orbit/clock using the reference orbit/clock; and
   processing, at the user device, observations of a GNSS receiver and the augmented orbit/clock generated at the user device to derive an improved positioning solution.

2. The method of claim 1, wherein the orbit/clock initial parameters is an orbit location value or orbit location correction of a GNSS satellite.

3. The method of claim 1, wherein the orbit/clock initial parameters further comprise a velocity or velocity correction of a GNSS satellite.

4. The method of claim 1, wherein the orbit/clock initial parameters further comprise a Solar Radiation Pressure (SRP) coefficients or SRP coefficient corrections.

5. The method of claim 1, wherein the orbit/clock initial parameters further comprise Earth Orientation Parameters (EOP) or EOP corrections.

6. The method of claim 1, wherein the orbit/clock initial parameters is a clock value or clock correction of a GNSS satellite.

7. The method of claim 1, wherein the orbit/clock initial parameters are communicated to the user device via a signal relay system.

8. The method of claim 7, wherein the signal relay system comprises a geostationary satellite system.

9. The method of claim 7, wherein the signal relay system comprises ground-based radios.

10. The method of claim 7, wherein the signal relay system comprises a data networking system.

11. The method of claim 1, wherein UEs receiving the orbit/clock initial parameters processes the GNSS observations and the augmented orbit/clock generated at the user device to derive an improved positioning solution.

12. An apparatus for performing GNSS augmentation and position determination using a precise orbit/clock reference that is represented by orbit/clock initial parameters, comprising:
   a receiver configured to obtain:
      GNSS augmentation data based on an augmented orbit/clock, the GNSS augmentation data comprising orbit/clock initial parameters; and
   a processing device coupled to the receiver, the processing device configured to:
      generate a reference orbit/clock based on numerically-integrating and extrapolating the orbit/clock initial parameters, the reference orbit/clock having a validity period longer than a broadcast orbit/clock;
      generate the augmented orbit/clock using the reference orbit/clock; and
      processing observations of a GNSS receiver and the augmented orbit/clock generated by the processing device to derive an improved positioning solution.

13. The apparatus of claim 12, wherein the orbit/clock initial parameters is an orbit location value or orbit location correction of a GNSS satellite.

14. The apparatus of claim 12, wherein the orbit/clock initial parameters further comprise a velocity or velocity correction of a GNSS satellite.

15. The apparatus of claim 12, wherein the orbit/clock initial parameters further comprise a Solar Radiation Pressure (SRP) coefficients or SRP coefficient corrections.

16. The apparatus of claim 12, wherein the orbit/clock initial parameters further comprise Earth Orientation Parameters (EOP) or EOP corrections.

17. The apparatus of claim 12, wherein the orbit/clock initial parameters is a clock value or clock correction of a GNSS satellite.

18. The apparatus of claim 12, further configured to receive the orbit/clock initial parameters processes the GNSS observations and the reference orbit/clock to derive an improved positioning solution.

19. A system apparatus for performing GNSS augmentation and position determination using a precise orbit/clock reference that is represented by orbit/clock initial parameters, comprising:
   a GNSS augmentation system data server configured to:
      provide GNSS augmentation data based on an augmented orbit/clock, the GNSS augmentation data comprising orbit/clock initial parameters;
   a relay system coupled to the GNSS augmentation system, the relay system configured to:
      communicate the GNSS augmentation data; and
   a GNSS receiver coupled to the relay system, the GNSS receiver configured to:
      receive GNSS augmentation data; and
      generate a reference orbit/clock based on numerically-integrating and extrapolating the orbit/clock initial parameters, the reference orbit having a validity period longer than a broadcast orbit/clock;
      generate the augmented orbit/clock using the reference orbit/clock; and
      process the observations of a GNSS receiver and the augmented orbit/clock generated at the GNSS receiver to derive an improved positioning solution.

20. The system of claim 19, wherein the signal relay system comprises a system selected from a group of communication systems consisting of a geostationary satellite system, ground-based radios, and a data networking system.

* * * * *